Feb. 17, 1925.
C. A. HOLLAND
COUPLING
Filed Dec. 14, 1921
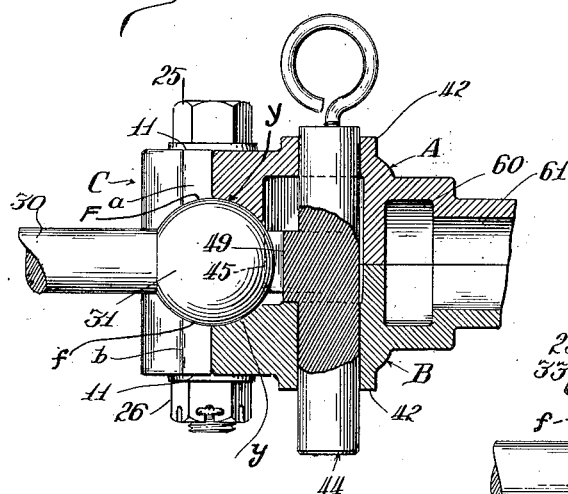
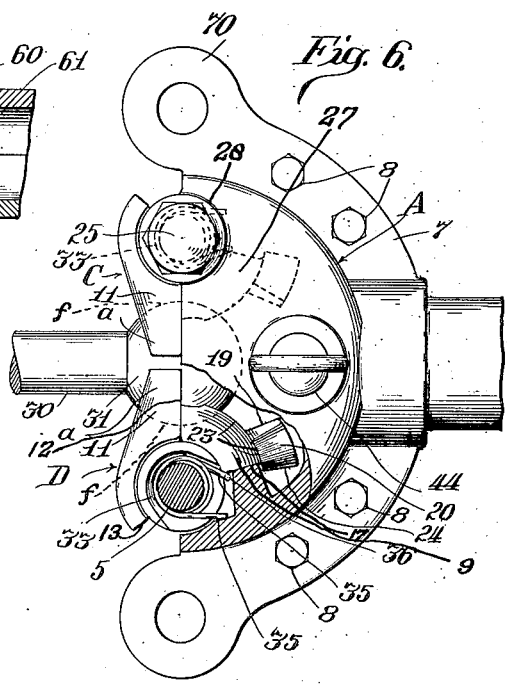
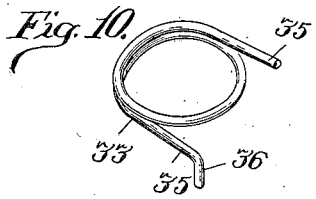
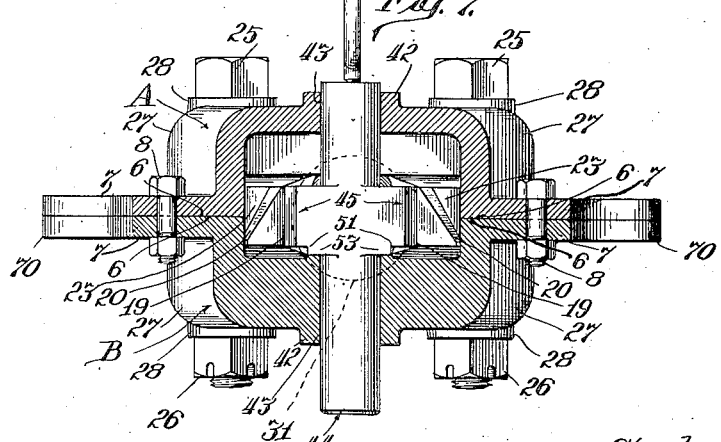
Inventor.
Charles A. Holland Patented Feb. 17, 1925.

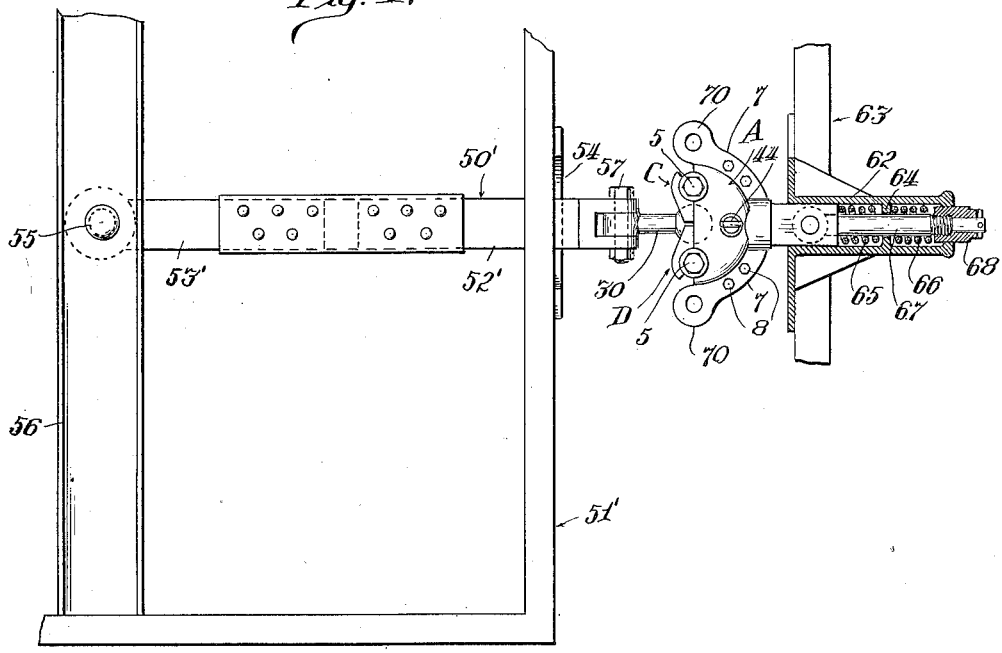
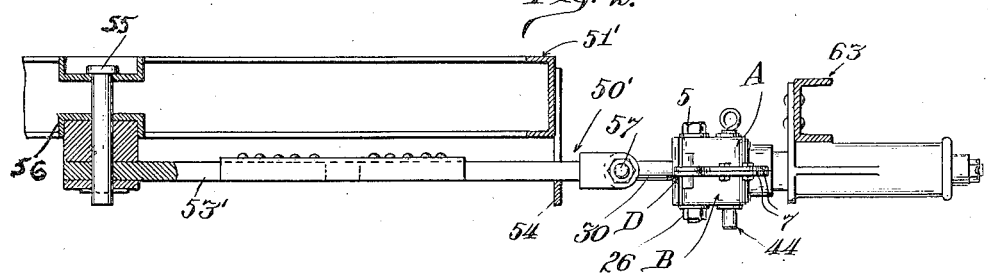

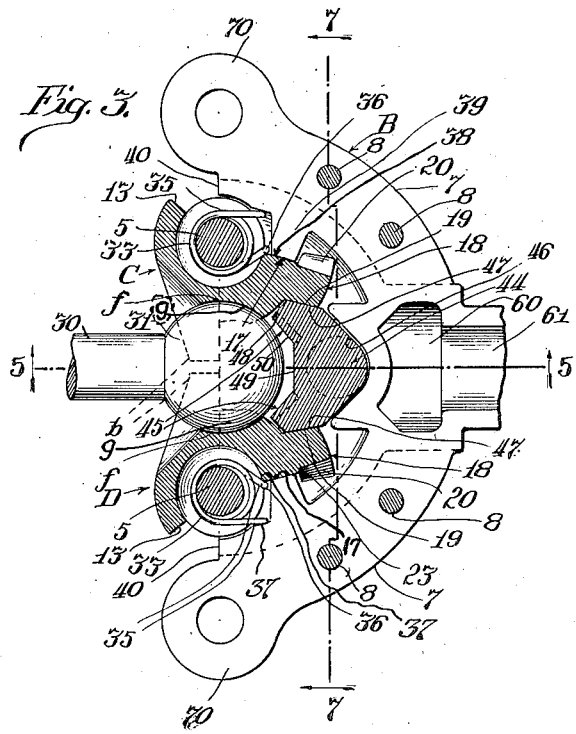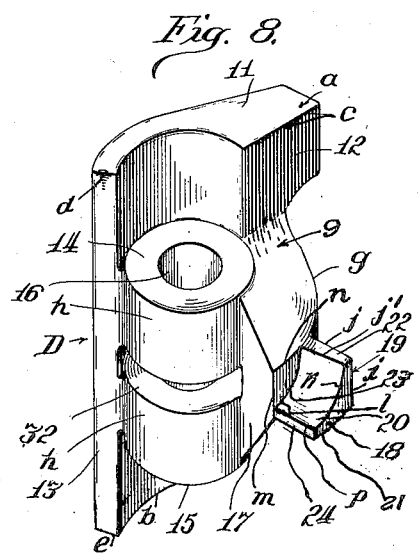

1,527,149

UNITED STATES PATENT OFFICE.

CHARLES A. HOLLAND, OF CHICAGO, ILLINOIS, ASSIGNOR TO JOHN B. BLECO, OF CHICAGO, ILLINOIS.

COUPLING.

Application filed December 14, 1921. Serial No. 522,289.

*To all whom it may concern:*

Be it known that I, CHARLES A. HOLLAND, a citizen of the United States, residing at Chicago, county of Cook, and State of Illinois, have invented a new and useful Improvement in Couplings, of which the following is a specification.

This invention relates to improvements in couplings. It is an object of the invention to provide a coupling particularly suitable for the connection of a trailer to a tractor vehicle, and it is also an object to arrange a coupling of this kind permitting the trailer independent movement with respect to the tractor to a very large degree and rendering the connection between the two vehicles as flexible as possible.

It is also an object of the invention to provide a coupling of this character with parts adapted to partly surround the terminal portion of a coupling member in a spherical cavity formed by several parts of the coupling.

It is furthermore an object of the invention to provide a coupling of this kind with a plurality of parts which are arranged and constructed so as to form by their assembly a spherical cavity portion having an inlet opening of a diameter smaller than the diameter of the ball which can be placed into that cavity, and to lock these parts against relative movement without interfering with the freedom of movement of the enclosed ball.

It is furthermore an object of the invention to equip a coupling of this character with means for normally forcing certain parts of the same into an open position so as to eject upon release of these parts one of the elements to be coupled, the elements being moved to closing position by the introduction of the part to be coupled into the coupling.

It is also an object of the invention to equip one of the elements of the coupling with portions which facilitate the attachment of steering rods for the trailer, and to provide an improved connection between the two vehicles, whereby shocks or violent sudden strains occurring in one of these vehicles, are absorbed by the connection itself.

With these and numerous other objects in view an embodiment of the invention is illustrated in the accompanying drawing wherein:

Fig. 1 is a top plan view and partly section view of two portions of a vehicle interconnected by a coupling;

Fig. 2 is a side elevation of the parts illustrated in Fig. 1;

Fig. 3 is a horizontal central section through the coupling in operative position;

Fig. 4 is a similar horizontal section, the coupling being shown in open position;

Fig. 5 is a vertical central section on line 5—5 of Fig. 3;

Fig. 6 is a top plan view of the coupling in closed position, similar to the horizontal section of Fig. 3;

Fig. 7 is a vertical section and partly in elevation on line 7—7 of Fig. 3;

Fig. 8 is a perspective view of one of the coupling members;

Fig. 9 is a perspective view of the locking element for the coupling, and

Fig. 10 is a perspective view of one of the elements which yieldingly forces the members into open position.

The coupling, as illustrated in Figs. 3 to 10 inclusive, comprises essentially four elements A, B, C, and D. The elements A and B may in their combination constitute the housing of the coupling, and the jaws or coupling members C and D are pivotally mounted in the housing by means of bolts 5, of which two are provided, each of these bolts extending through both of the housing parts A and B. The housing elements A and B are in engagement with each other on a central plane which in the normal operation of the device may be considered a horizontal plane at right angles to the plane defined by the axes of the pins 5, and for the purpose of bringing the housing parts A and B to operative position each of them is provided with flat seats 6 having flange extensions 7 through which the fastening bolts 8 are passed. As clearly shown in Fig. 7, the flat seating portions 6 of the two housing elements A and B are in one plane with the engaging surface portions of the flanges 7.

One of the coupling members C, D namely the member D is illustrated in detail in Fig. 8, and the other member C is symmetrically constructed so as to be operative from the opposite side of the coupling.

From Figs. 8 and 5 it will be seen that these elements C and D comprise upper and lower claws a and b, the claw a only being visible in Figure 8, while claw b is in vertical alinement therewith of similar configuration, which terminate each in upper and lower flat surfaces 11, the upper horizontal surface 11 being shown in Fig. 8. These surfaces 11 may be parallel to each other and extend horizontally when the members C and D are in operative position. The upper surface 11 is joined at the edge c' by another surface 12 which is at right angles thereto, and both of the surfaces 11 at the upper and lower claw a and b are connected by a rear straight surface 13 which joins the surfaces 11 at the edges d and e respectively, Fig. 8. The claws a and b of each of the members C and D are connected by a spherical surface portion f, and by a projecting lug or portion 9 which presents a spherical surface g of the same diameter and center as portions f and adjoining the spherical surface portion f. When the two members C and D are placed in operative position, the spherical surface portions g and f on both members are in supplementary relation to form a large part of a spherical cavity.

Each of these elements C and D is furthermore provided with a lug h having an arcuate partly cylindrical surface and end surfaces 14 and 15 respectively, which end surfaces are located at right angles to the axis of the cylinder defined by the other surface of lug h. This lug h furthermore is provided with a concentric bore 16 extending entirely through the same. The axis of this bore as may be seen from Fig. 4 is located in that plane which is defined by the surface 13 and also in a plane defined by the surface 12.

The part-cylindrical surface of the lug h intersects the surface 13, as shown in Figs. 8 and 4, and at another line parallel to the axis of the lug h, a plane 17 extends from the arcuate surface of the lug h between the horizontal surface 14 and the surface 15 of this lug and projects approximately radially to the lugs. This surface 17, therefore, forms one of the end surfaces of the lug 9 which projects from the main portion of the member C or D.

An extension, indicated as a whole at 18, projects from the lug 9, and this extension 18 is provided with a straight vertical surface 19 and with an inclined surface 20. The outer edges r and k of the surfaces 19 and 20 are united by an approximately cylindrical surface portion 21 concentric to the bore 16, while the upper edges j and j' of the surface portions 19 and 20 are united by any approximately horizontal surface 22. This horizontal surface, as may be seen from Fig. 8, merges into the lug 9. The inner slanting edge l of the inclined surface portion 20 is jointed to an approximately cylindrical surface 23 adjacent the edge m of the plane surface portion 17. The upper side of this triangular cylindrical surface 23 is formed by the edge n, which is a boundary line of the lug 9. The surface 20, which is substantially at an angle to the axis of the bore 16 does not extend to the bottom of the lug 18, but intersects a vertical surface 24 of said lug at the edge p. The lug 18 in general therefore forms a wedge for a purpose to be described below.

The two jaws C and D are united with the housing formed by the members A and B through bolts 5 with heads 25 and which are held in position by the castellated nuts 26. For the purpose of receiving the jaws and for cooperation with them, the members A and B extend forwardly from the flanged portion 6, 7, as indicated at 27, in Figs. 5 to 7. These lugs or enlargements 27 of the housing portions A and B are provided with suitable bosses 28 on which the heads of the bolts 5 and the nuts 26 are seated. In the assembly of the parts the inner spherical surface portions y of the housing members A, B also are concentric with the portions g and f. The other element of the coupling is formed by a rod 30 terminating in a ball 31 which is to be moved into engagement with the spherical portions f, g, y of the members A, B, C and D, whereupon, as may be seen from Fig. 3, a withdrawal of this spherical head 31 from the other coupling member A, B cannot be effected.

From Fig. 8, it will be noticed that the cylindrical lug h is provided with a transverse slot 32 which may serve for receiving a yielding element adapted for cooperation with the jaws C, D and with the enclosing housing members A or B. This yielding element as illustrated in Fig. 10, in the form of a spiral spring 33, terminates in two legs 35, which, owing to the resiliency of the spring, have a tendency to spread apart. The leg 35 has at its end a portion 36 which is bent out of alignment with the leg 35, and this portion in the operation of the device rests at 37, Fig. 3, against a point of one of the housing members A or B. The other leg, therefore, acting on that edge at which the surface 17 intersects the lug h, will have a tendency to move the entire jaw C or D as the case may be, outwardly, when the member 31 of the other coupling part is withdrawn from the spherical cavity. The female clutch member formed of the combined elements, A, B, C, and D, is therefore, automatically moved to open position when a locking element to be described, is withdrawn, the jaws C and D then assuming that position which is shown in Fig. 4, and aiding in the withdrawal of the male coupling member 30, 31. Upon the insertion of this coupling member 30, 31, however, from the position shown in Fig. 4, to the position shown in Fig. 3, this coupling member acting against the spherical surfaces *f* and *g* of the two jaws C, D, will have a tendency to swing each of these jaws about the bolt 5, thereby placing the spring 33 under tension. This movement of both of these jaws C, D to operative position, however, will be limited by the engagement of the surface 17 with the outer surface 38 of a lug 39, projecting from the housing parts A, B inwardly, as indicated in Figs. 3, 4 and 6. On the other hand, the spring 33 upon withdrawal of the coupling member 31 has a tendency to force the jaws C, D to release position, and the movement of these jaws will be limited by the engagement of the surface 13 with vertical surfaces 40 of the housing portions A, B which lie in a plane containing also the axes of the bores 16 for the bolts 5, Fig. 4. The invention, therefore, includes means for automatically limiting the movement of the coupling parts C, D to closing or operative, as well as to inoperative position.

The spring 33 may also be placed on top of the lug *h*, instead of being located in the slot 32. This is shown in Fig. 6.

The locking element through which a movement of the coupling jaws C, D from operative position is prevented, is constructed in the form of a pin, illustrated in Fig. 9. Both of the housing parts A and B are provided near their rear end and centrally of the bosses 28 with bosses 42 having bores 43 which in both of these elements are in alignment with each other when the elements A and B have been properly joined. It will be noted, however, that the bottom part of the casing element B is heavier than the top part of the casing portion A, Fig. 7. The locking pin is shown in the form of a cylindrical bolt 44 having intermediate its ends projecting wings indicated as a whole at 45. These wings have rear surfaces 46 which merge into the cylindrical surface of the pin. At an edge *t* which extends approximately parallel to the axis of the pin 44, the surface 46 of each of these locking wings is joined by a locking surface 47 which also is substantially vertical, but extends at an angle to the surface 46. A side surface 48 adjoins the locking surface 47, and is also located in a plane parallel to the axis of the pin 44, and the front surface 49 of the wings is likewise in a plane parallel to the axis of the same. The surface 50 which joins the side surfaces 48 of the locking wings with the central surface 49 of the same is not necessarily in a plane parallel to the axis of the pin, but may be inclined inwardly to said plane, and the lower edge of the plane 50 is connected with the bottom surface 51 of the wing portion by a short bevel plane 52. An arcuate enlargement 53 concentric with the axis of the pin 44 is disposed below the locking wings 45 and may be seated in a suitable arcuate recess or in a boss of the housing part B. The pin 44 may be raised from the position shown in Fig. 5 or 7, without being entirely withdrawn from the housing.

The assembly of the device will be clearly understood from the above description. The two casing parts A and B are secured to each other after the locking pin 44 has been seated in the bore 43 of the lower casing member B. After these parts have been united the coupling jaws C and D are inserted into the casing and pivotally secured by the bolts 5. The yielding elements 33 for forcing the jaws C, D to released position are also placed around the pivot bolts. Owing to the provision of the springs 33, the jaws C and D will then be forced into the position indicated in Fig. 4, in which the end surfaces 40 of the housing members A, B act as an abutment limiting the movement of the jaws to release position.

When now the male coupling member formed by the bar 30 and ball 31 is introduced between the jaws C and D the latter are forced to turn about their pivot bolts 5 overcoming the tension of the springs 33 until the lugs 18 are in such position that the surfaces 17 on the jaws are in abutment with the front surface 38 of the lug 39 of the housings, as illustrated in Fig. 3. In this movement of the jaws from the position of Fig. 4 to the position shown in Fig. 3, the slanting surface 20 will enter into engagement with the wings 45 of the locking pin, the projecting part 24 of the lug 18 first entering into engagement with the beveled portion 52 of the wings, whereby owing to the wedge shaped formation of the lug 18, the circumferential movement of this wedge will cause the wings 45 to be moved axially, whereby automatically the pin 44 is lifted until the lug 18 has passed beyond the wings 45 of the locking pin. The pin will then automatically drop into the position indicated in Fig. 7, in which position, as shown in Fig. 3, the holding surface 47 of the wings is in engagement with the rear surface 19 of the lug 18, thereby rendering a displacement of the jaws C, D impossible until this engagement between the surface portions 19 and 47 is interrupted. In this operative position, Fig. 3, the inward movement of the jaws is therefore limited by the engagement of the surface portion 17 on the jaws with the surface portion 38 of the lugs on the housing, and the outward or release movement of the jaws is rendered impossible owing to the engagement of the surfaces 47 on the locking pin with the rear surfaces 19 of the lugs 18 of the jaws. The jaws now being held in predetermined operative position, it is obvious that the ball 31 of the male coupling member is secured against withdrawal in the portion of the spherical cavity formed by the members A, B, C, D and that in spite of this prevention of the withdrawal of the coupling member, an angular movement of the coupling member 30 in any desired direction about the center of the ball 31 is provided.

Figs. 1 and 2 illustrate the attachment of the male coupling member 30 to a draw bar 50' of a trailer, the frame of which is indicated in general at 51'. This draw bar, composed of two elements 52' and 53', is slidably carried in a bracket 54 at the front end of the frame and is pivotally secured by means of the bolt 55 in a transverse portion 56 of the frame. It will also be noted from Figs. 1 and 2 that the pivotal movement of the draw bar 50' may take place in a certain plane, as for instance in a horizontal plane, and that the coupling member 30 is secured to this draw bar by a pivotal connection 57 which permits the coupling member 30 to move in a vertical plane. The greatest freedom of movement therefore between the trailer, connecting elements, and the coupling itself is assured.

The coupling formed of the casing A and B, and the jaws connected therewith, serves for receiving in a known way the draw bar through which this coupling is yieldingly connected with the tractor part of the vehicle. The casing parts A and B are both extended rearwardly to form semi-cylindrical chambers which in the assembly of these two casing parts may supplement each other to form the cylindrical chambers 60 and 61. The chamber 60 having a larger diameter than the cylindrical chamber 61, may serve to receive the head of a draw bar or bolt slidable in a bracket 62 which is attached to the tractor frame 63. The bracket 62, as shown, is provided with an intermediate wall 64 and springs 65 and 66 are interposed between the head of the bolt 67 and this intermediate wall, and between this intermediate wall and the rear head 68 on the bolt 67. The sliding movement of the bolt 67 which may be produced by the traction strain, is therefore yieldingly resisted in either direction, and in this way the coupling combines the greatest degree of flexibility with a very large degree of resiliency.

The casing parts A and B may be enlarged at their sides to form eye portions 70 in which the steering elements for the tractor, not shown, may be inserted.

I claim:

1. In a coupling, the combination of two housing members in engagement with each other on a flat surface, two other coupling members in engagement with the housing members and engaging said housing members also on a flat surface, said second coupling members being pivotally connected with the first named coupling members and being provided with spherical surface portions in opposition to each other and adapted when assembled in operative position to supplement these surface portions to a spherical cavity portion sufficiently large to prevent withdrawal in any direction of a ball inserted into the spherical cavity and having the radius of the spherical cavity, and locking means for preventing pivotal movement of the coupling members to open position.

2. In a coupling the combination of a pair of rigidly interconnected coupling members, each of which is provided with a recess and with a spherical surface portion, the two spherical surface portions of the coupling members having the same diameter and a common center, two other coupling members pivotally interconnected with the first named coupling members and provided with spherical surface portions of the same diameter and the same center as those of the first named coupling members, said second named coupling members being provided with extensions which are seated in the recesses of the first named coupling members, and means for locking said extensions against movement with respect to the first named coupling members.

3. A coupling comprising in combination, a pair of members formed to constitute a housing, open at one end, two coupling members pivotally connected with each of said housing members, the coupling members being provided with spherical surface portions at the same diameter and adapted to supplement these surface portions to a spherical cavity portion sufficiently large to prevent withdrawal of a ball inserted into the spherical cavity portion, and a locking element slidably carried by said housing members, adapted to prevent the movement of said coupling members to open position.

4. In a coupling the combination of two rigidly interconnected coupling members provided with spherical surface portions of the same diameter and center and in opposition to each other, two other coupling members pivotally interconnected with the first named coupling members and also provided with spherical surface portions of the same diameter and center as the first set of coupling members, all of said surface portions supplementing themselves to a cavity which constitutes the major portion of a sphere symmetrically arranged with respect to the entire set of coupling members, the first named coupling members having seating surfaces for the other coupling members, a bolt extending through the first named coupling members and means on the bolt for engaging said second named coupling members and for forcing same against seating surfaces on the first named coupling members.

5. In a coupling the combination of two sets of coupling members each of which is provided with a spherical surface portion and all of these portions forming in their combination the major part of a spherical cavity, one set of these members being recessed, the other pair of the coupling members having extensions seated in said recesses, and a locking bolt extending through one set of coupling members and provided with locking means located in said recesses and acting upon said extensions for holding the entire set of coupling members against relative movement of the several members to each other.

6. In a coupling the combination of a set of coupling members rigidly interconnected and provided with spherical surface portions of the same diameter and center in opposition to each other, two other coupling members pivotally connected with the first named coupling members and also provided with spherical surface portions of the same diameter and center as the first named coupling members, the second coupling members being provided with extensions and the extensions having lugs projecting therefrom, a locking bolt movably secured in the first named coupling members and provided with means for engaging said lugs to prevent thereby the rotation of the second set of coupling members with respect to the first set of coupling members, said locking bolt being held against rotation in a recess of the first named coupling members.

7. In a coupling two sets of coupling members, provided with concentric spherical surface portions of the same diameter which in their combination form the major part of a spherical cavity, two of these coupling members being movable relatively to each other and to the other members, said other members being fixed relatively to each other, a locking bolt seated in the fixed members and having a locking portion in engagement with the movable members, the fixed members being provided with a cavity into which said locking portion may be withdrawn to effect the release of the movable coupling members.

8. In a coupling the combination of two fixed coupling members in opposition to each other, and two movable coupling members secured to said fixed members in opposition to each other, all of the members being provided with complementary spherical surface portions so as to form the major part of a complete spherical cavity when assembled, a bolt having a locking enlargement removably seated in one set of said coupling members, and held against rotation in said set, the locking enlargement of said bolt engaging when in operative position said movable coupling members and preventing thereby rotation of the same in a predetermined direction, one of the fixed coupling members having a recess into which the locking enlargement of the bolt may be moved and this set of coupling members being provided with stop surfaces engaged by surfaces of the movable coupling members.

9. A coupling comprising in combination a pair of members adapted to form a housing open at one end, coupling members movably connected with said housing members and provided with spherical surface portions adapted to form in the operative position of said second members, a spherical cavity sufficiently large to prevent the withdrawal in any direction of a ball introduced into said cavity, means for locking the coupling members in operative position and yielding means for moving said coupling members to released position upon withdrawal of the locking member.

10. In a coupling the combination of a housing, coupling members pivotally mounted in said housing and provided with spherical surface portions, adapted to form a spherical cavity when the coupling members are placed in operative position, the spherical cavity portion being sufficiently large to prevent withdrawal of a ball inserted into said spherical cavity, a locking element for said coupling members, and a spring acting on said coupling members and adapted to move said members to open position upon withdrawal of the locking element.

11. In a coupling the combination of a housing, coupling members provided with spherical surface portions which supplement each other to a spherical cavity portion of sufficient size to prevent withdrawal of a ball inserted into said spherical cavity portion, means for locking the coupling members in operative position, and a spring interposed between said coupling members and the housing.

12. A coupling, comprising in combination, a housing portion, coupling members movably united with said housing portion, and a locking element for maintaining said coupling members in operative position, said coupling members being provided with portions for moving said locking element to release position upon movement of said members to operative position.

13. In a coupling the combination of a housing portion, coupling members movably connected therewith, a locking element for maintaining the coupling members in operative position, said locking element and coupling members being provided with co-operating portions adapted to effect a movement of the locking element to release position when the coupling members are being moved to operative position and with additional portions for preventing return movement of the coupling members to inoperative position.

14. A coupling comprising coupling members, a support for the same, a locking element for maintaining said coupling members in operative position, said members and locking element being provided with co-operating surface portions adapted to effect a release movement of the locking element when the coupling members are moved to operative position, and an automatic return movement of the locking element to locking position when said coupling members have been moved to operative position.

15. In a coupling the combination of a housing having its interior surface portions representing parts of a spherical cavity, said portions having a common center, coupling members pivotally connected with the housing, each of said coupling members also being provided with a concave spherical surface portion complementary to the spherical surface portions of the housing, a locking element non-removably positioned within the housing, and means for forcing the coupling members to release position upon removal of the locking element from operative position.

16. A coupling comprising a plurality of elements provided with complementary spherical concave portions of common center and uniform radius, and means in the interior of the coupling for retaining coupling elements in a position in which said spherical surface portions supplement each other to form the major part of a complete spherical cavity.

In testimony whereof, I affix my signature in the presence of two witnesses at 36 W. Randolph St., Chicago, Illinois.

CHARLES A. HOLLAND.

Witnesses:
DANIEL A. BRENNAN,
IRENE MARTIN.